United States Patent
Constantinides et al.

(10) Patent No.: US 6,378,414 B1
(45) Date of Patent: Apr. 30, 2002

(54) REMOVABLE FILTER CAP FOR SPRING BRAKE ACTUATOR

(75) Inventors: Savvas K Constantinides; Teddy D. Smith, both of Fresno, CA (US)

(73) Assignee: TSE Brakes, Inc., Fresno, CA (US)

( * ) Notice: Subject to any disclaimer, the term of this patent is extended or adjusted under 35 U.S.C. 154(b) by 0 days.

(21) Appl. No.: 09/340,381

(22) Filed: Jun. 28, 1999

(51) Int. Cl.[7] .................................................. F01B 7/00
(52) U.S. Cl. .......................................................... 92/63
(58) Field of Search ....................................... 92/63, 79

(56) References Cited

U.S. PATENT DOCUMENTS

| | | |
|---|---|---|
| 1,615,570 A | 1/1927 | Farmer |
| 2,135,100 A | 11/1938 | Campbell |
| 2,142,190 A | 1/1939 | Hewitt |
| 2,177,767 A | 10/1939 | Campbell |
| 2,289,043 A | 7/1942 | Rockwell |
| 2,792,686 A | 5/1957 | Ingres |
| 3,183,795 A | 5/1965 | Kirk |
| 3,291,004 A | 12/1966 | Stevenson |
| 3,302,530 A | 2/1967 | Dobrikin et al. |
| 3,495,503 A | 2/1970 | Gummer et al. |
| 3,508,469 A | 4/1970 | Williams |
| 3,508,470 A | 4/1970 | Swander et al. |
| 3,613,515 A | 10/1971 | Swander et al. |
| 3,710,692 A | 1/1973 | Valentine |
| 3,712,181 A | 1/1973 | Swander |
| 3,730,056 A | 5/1973 | Swander |
| 3,759,147 A | 9/1973 | Johnsson et al. |
| 3,811,365 A | 5/1974 | Gordon |
| 3,842,716 A | 10/1974 | Swander |
| 3,896,706 A | 7/1975 | Newstead et al. |
| 3,977,308 A | 8/1976 | Swander et al. |
| 4,116,114 A | 9/1978 | Swander et al. |

(List continued on next page.)

FOREIGN PATENT DOCUMENTS

| | | |
|---|---|---|
| DE | 3239971 A1 | 5/1984 |
| DE | 3241548 A1 | 5/1984 |
| EP | 0 098 029 | 1/1984 |
| FR | 2208484 | 6/1974 |
| FR | 2279977 | 7/1975 |
| FR | 2384164 | 3/1978 |
| FR | 2521651 | 2/1983 |
| JP | 47-9644 | 3/1972 |
| JP | 49-127328 | 12/1974 |
| JP | 52-185 | 1/1977 |

(List continued on next page.)

OTHER PUBLICATIONS

MGM Model E–TS Series Sever–Service Spring Brakes brochure Aug. 1986.
Anchorlok/Life Seal "A Unique GORE–TEX Filter Protects our Spring Brake" brochure 1996.
Anchorlok/Life Seal "Six Year No Hassle Guarantee" brochure 1996.

Primary Examiner—Edward K. Look
Assistant Examiner—Thomas E. Lazo
(74) Attorney, Agent, or Firm—Mark D. Miller

(57) ABSTRACT

Disclosed is an easily removable and replaceable filter cap for attachment the caging tool opening in the top of the upper housing of an emergency brake actuator. The cap includes a plurality of ventilation holes and a membrane preferably made of oilophobic and hydrophobic material which allows air to pass into and out of the emergency brake housing, while keeping foreign material out. The present invention may be easily adapted for use on any of a large number of existing emergency brake housing assemblies at minimal cost. When the filter cap of the present invention is installed, breather openings in the housing are plugged so that all air is filtered through the membrane in the cap. In an emergency or service situation, the cap may be easily removed to allow a caging tool to be inserted into the upper housing to release the emergency spring brake. After removal, the cap may be reused or replaced.

17 Claims, 13 Drawing Sheets

U.S. PATENT DOCUMENTS

| | | |
|---|---|---|
| 4,480,530 A | 11/1984 | Holmes |
| 4,508,018 A | 4/1985 | Choinski ................. 92/128 |
| 4,860,640 A | 8/1989 | Ware |
| 4,890,540 A | 1/1990 | Mullins |
| 4,945,818 A | 8/1990 | Ware |
| 5,002,164 A | 3/1991 | Bowyer |
| 5,016,523 A | 5/1991 | Bowyer |
| 5,116,650 A | 5/1992 | Bowser |
| 5,320,026 A | 6/1994 | Pierce ..................... 92/63 |
| 5,345,858 A | 9/1994 | Pierce |
| 5,372,059 A | 12/1994 | Pierce ..................... 92/48 |
| 5,377,579 A * | 1/1995 | Pierce ..................... 92/63 |
| 5,421,242 A | 6/1995 | Bachli et al. |
| 5,640,893 A | 6/1997 | Stojic |
| 5,655,431 A | 8/1997 | Pierce |
| 5,713,238 A | 2/1998 | Pierce |
| 5,722,311 A | 3/1998 | Pierce ..................... 92/63 |
| 5,725,076 A | 3/1998 | Pierce |
| 5,771,774 A | 6/1998 | Stojic |
| 5,785,390 A | 7/1998 | Gold et al. |
| 5,836,233 A | 11/1998 | Rumsey ..................... 92/63 |
| 5,860,708 A | 1/1999 | Borders et al. |
| 5,873,297 A | 2/1999 | Stojic ..................... 91/444 |
| 5,937,733 A | 8/1999 | Stojic |
| 6,029,447 A * | 2/2000 | Stojic et al. ............... 60/453 |

FOREIGN PATENT DOCUMENTS

| | | |
|---|---|---|
| JP | 57-179565 | 11/1982 |
| JP | 58-97550 | 6/1983 |
| JP | 58-187634 | 12/1983 |
| JP | 60-30868 | 3/1985 |
| JP | 63-53159 | 3/1988 |
| JP | 3-75069 | 7/1991 |
| JP | 7-31541 | 6/1995 |
| JP | 7-291117 | 11/1995 |

* cited by examiner

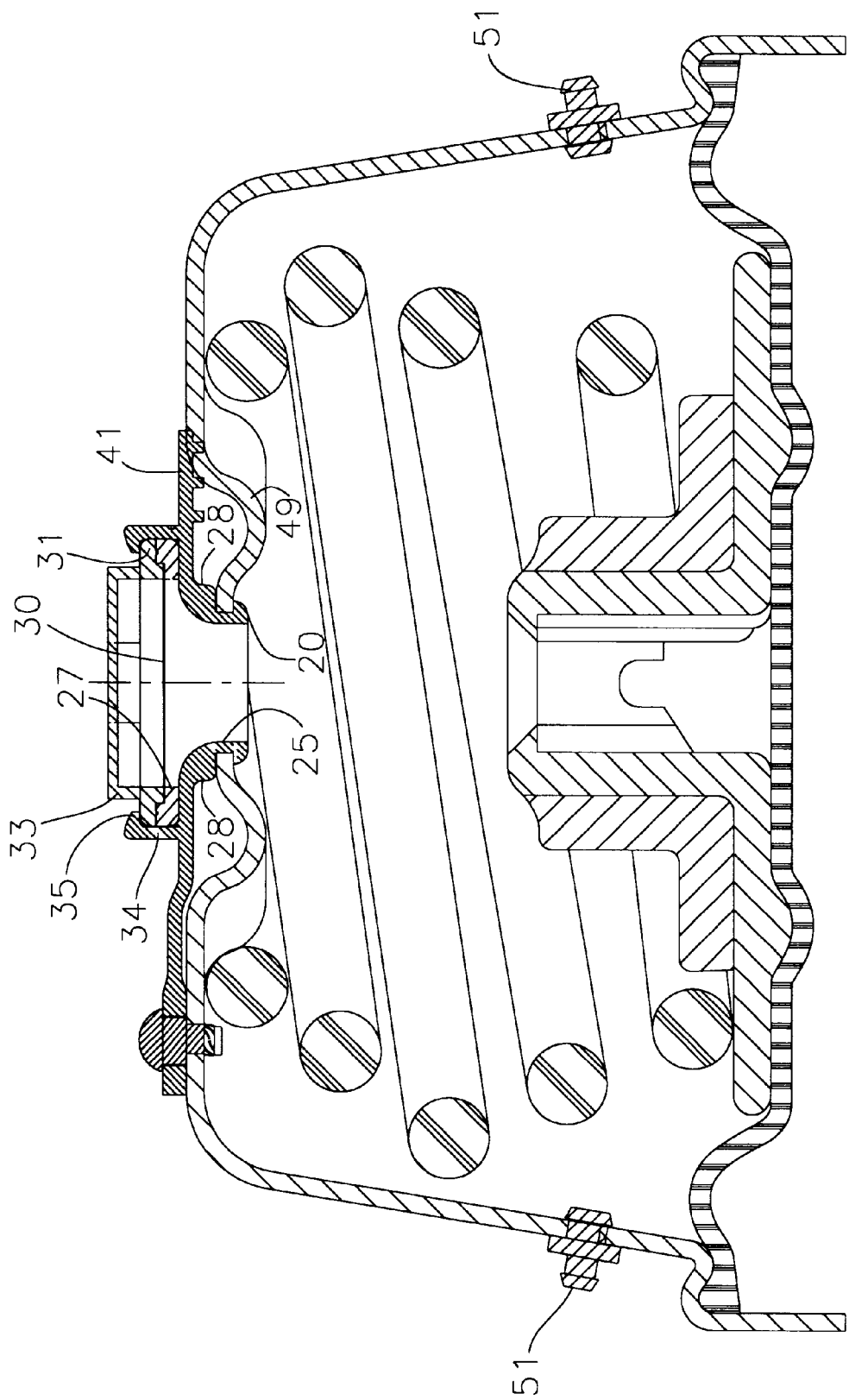

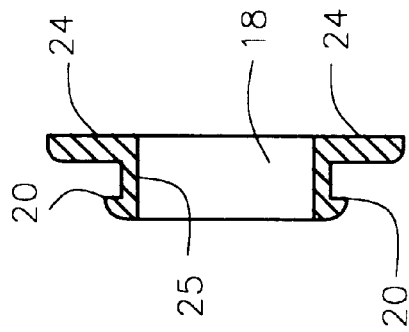
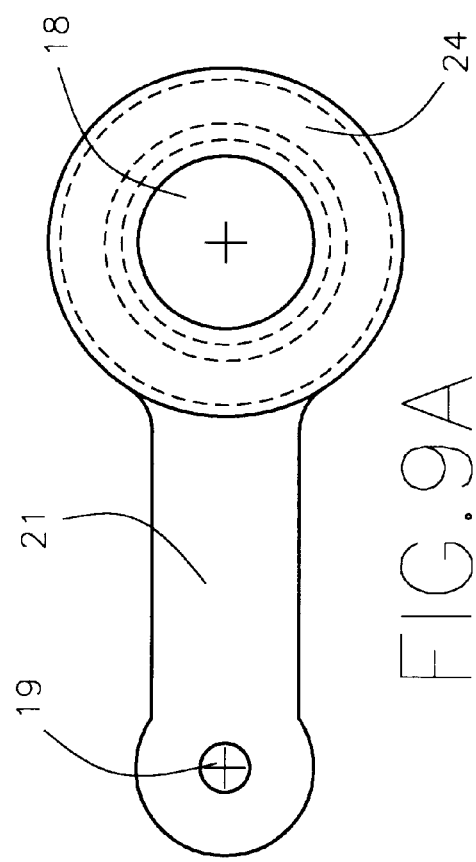
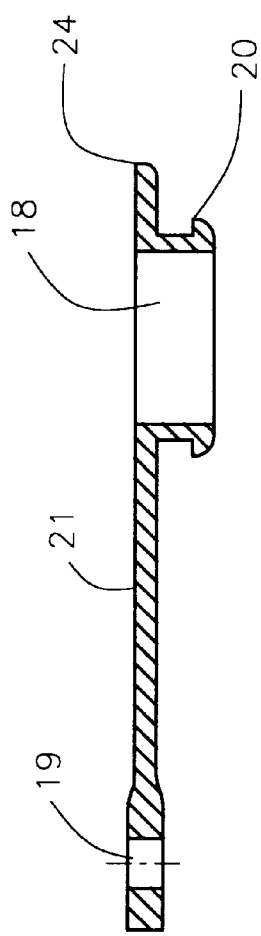

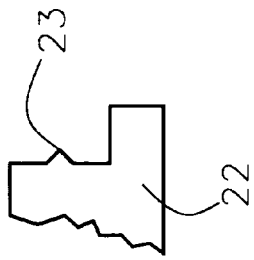
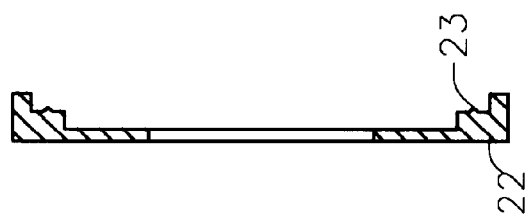
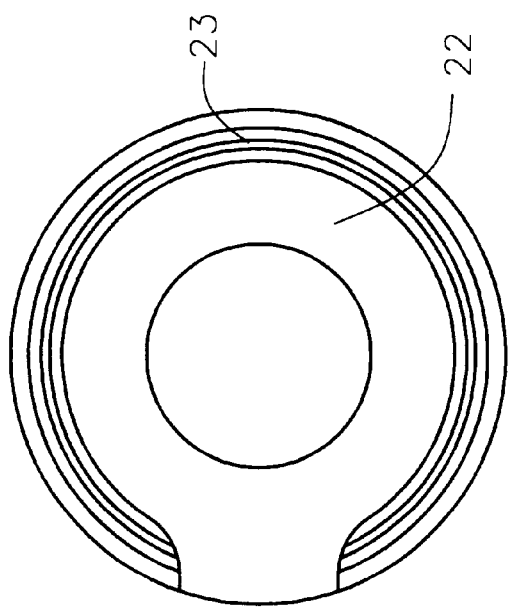

REMOVABLE FILTER CAP FOR SPRING BRAKE ACTUATOR

BACKGROUND OF THE INVENTION

1. Field of the Invention

The present invention relates to spring brake systems for heavy duty vehicles, and in particular to a removable, breathable filter cap for attachment to the emergency brake housing of a spring brake actuator which prevents moisture and unwanted contaminants from entering the actuator, while allowing air to pass into and out of the actuator during normal use.

2. Description of the Prior Art

Spring brake actuators are widely used in the trucking industry to control the brakes of heavy duty vehicles and their trailers. There are two basic types of spring brake actuators, service brake actuators, and emergency brake actuators. These actuators can be deployed as separate assemblies, or combined into a single dual assembly including both a service brake and an emergency brake actuator. A service brake actuator is operator controlled and is used for slowing or stopping a vehicle. An emergency or parking brake actuator is typically held off with air pressure while the vehicle is in use, but automatically engages when air pressure is removed, such as when the vehicle is turned off or if there is a failure in the vehicle air system.

A typical service brake actuator is characterized by a closed housing which contains a movable diaphragm stretched across the inside. One side of the diaphragm moves a slidable push rod which extends out of the housing for attachment to the brakes of the vehicle. On the other side of the diaphragm a sealed chamber is formed within the housing. An opening is provided in the sealed service brake chamber for connection to a pneumatic (air) pressure source usually provided by an on-board air compressor. The brakes of the vehicle can be applied by introducing sufficient pneumatic pressure into the sealed chamber to act against the service brake diaphragm which moves the push rod out. A small return spring is ordinarily provided inside the service brake housing around the push rod to urge it to retract when the air pressure behind the diaphragm is reduced.

A typical emergency brake actuator is attached in axial alignment with or made a part of the service brake assembly. The emergency brake is a separate closed housing which contains a heavy main compression spring and a second movable diaphragm creating a second sealed chamber. The emergency brake diaphragm is also attached to or directly associated with the slidable central push rod of the service brake. The second sealed chamber is formed inside the emergency brake housing on one side of the diaphragm, and the heavy main compression spring is deployed on the opposite side. As with the service brake, the sealed chamber of the emergency brake is connected to the on-board pneumatic source of the vehicle. As long as sufficient air pressure is provided to the sealed chamber, the diaphragm in the emergency brake will remain fully expanded thereby compressing (caging) the main spring. However, should air pressure fall, or should there be a leak in the sealed chamber, the diaphragm will be unable to hold the main compression spring in place. When this occurs, either slowly or quickly, the main compression spring will expand causing the push rod to be extended out thereby applying the brakes of the vehicle.

Under normal conditions, when the vehicle is parked, the air pressure to the emergency brake is removed causing the main compression spring to apply the brakes. As the emergency brake is engaged and disengaged, air pressure is introduced and removed from the lower sealed chamber in the emergency brake housing, causing the diaphragm inside the housing to move back and forth. In order for the diaphragm to expand and compress the main spring, the air in the upper housing around the spring must be allowed to escape to the outside. Then, in order for the diaphragm to contract and release the main spring, air must be allowed to enter the area of the upper housing around the spring. Typical emergency brake housing assemblies include a plurality of air holes in the upper housing in the vicinity of the main spring to allow air to enter and exit this region as the diaphragm moves back and forth. The unfortunate effect of this action is to allow dirt, water, oil, debris, and other unwanted materials to enter the emergency brake housing from the outside through the air holes. Several inadequate or cumbersome solutions have been advanced to respond to this problem.

The invention of U.S. Pat. No. 4,508,018 describes a sealed internal breathing system which utilizes a tube connected between the service brake housing and the emergency brake housing. Air is transmitted between the two sealed housings through the tube, so that no outside air is ever needed. However, the use of such a tube requires specially designed housings for both the spring brake and emergency brake making it difficult and costly to manufacture.

The invention of U.S. Pat. No. 5,320,026 employs a rubber dust guard in the upper housing between the power spring and the housing wall to prevent particulate matter from passing beyond the spring into the actuator tube where it might affect the sliding rod. However, this invention does not prevent foreign matter from entering the upper chamber in the first place through the air openings. Thus, foreign material can collect around the power spring potentially affecting operation of the brake.

The inventions of U.S. Pat. Nos. 5,372,059 and 5,722,311 use a pair of valves: a first one-way valve allows air to enter the area around the main spring only from the sealed chamber in the spring brake housing; another other one-way valve only allows air to escape from this area to the outside. A similar approach is taught in U.S. Pat. No. 5,873,297 which employs a double check valve in the housing, and a separate valve in the upper housing diaphragm for communication between the sealed chamber and the area around the main spring. Each of these inventions requires cumbersome specially designed emergency brake housing structures including at least one opening(s) in the spring brake diaphragm, together with the use of no less than two separate valves, leaving such systems vulnerable to several different kinds of failures which could be costly and difficult to repair.

The invention of U.S. Pat. No. 5,836,233 describes a spring brake actuator which employs breather holes located on the cylindrical side walls of the upper housing such that when the main spring is compressed or caged, the diaphragm covers the holes. However, when uncaged, these unfiltered breather holes are exposed to the atmosphere, allowing foreign material to enter the housing. A check valve is also provided in a cap attached to the upper housing.

A recent device utilizes a hydrophobic filter system using a Gore-Tex® membrane which is integrated into the top of the emergency brake housing to prevent water and contaminants from entering the housing while allowing air to flow in and out. However, because this filter system is integrated into a caging device (used to manually compress the main spring) it is impossible to remove or change the filter should it become clogged. The Gore-Tex® material does not breathe well, and may clog easily. Moreover, the integral caging device is bulky and requires more space under the vehicle than a brake without such a device, thereby making such a brake assembly unusable on vehicles with restricted available space.

SUMMARY OF THE INVENTION

The present invention overcomes the drawbacks of the prior art while still enjoying the benefits of a breathable upper housing for an emergency spring brake actuator by providing an easily removable and replaceable filter cap for attachment the top of the upper housing which includes a plurality of ventilation holes and a membrane through which air is allowed to pass into and out of the emergency brake housing during normal use. The membrane itself is preferably made of an oilophobic and hydrophobic material (not necessarily Gore-Tex®) in order to prevent oil, water and debris from entering the housing. The filter cap of the present invention may be removably inserted into the upper caging opening of the emergency brake actuator. This opening is provided in many actuators in order to allow a caging tool to be inserted into the actuator to cage (compress) the main spring when no air pressure is available. As a result, the present invention may be easily adapted for use on any of a large number of existing emergency brake housing assemblies at minimal cost, thereby avoiding the need for such costly, cumbersome and unnecessary structures as valves, tubes, perforated diaphragms and/or integrated caging apparatus in the brake actuator.

Many existing brake actuators employ a plurality (e.g. four or more) of unfiltered air openings in the upper housing. When the filter cap of the present invention is installed, these openings are plugged so that all air is filtered through the membrane in the cap. In an emergency or service situation, the cap may be easily removed to allow a caging tool to be inserted into the upper housing to release the emergency spring brake. After removal, the cap may be reused or replaced.

Several alternative designs for the filter cap of the present invention are available. In the preferred design, the cap includes an annular flange which snaps into the caging tool opening at the top of the emergency spring brake housing. The filter (which includes the membrane and breathing holes) is a separate piece which snaps into the large central opening in the cap. The cap has two oppositely positioned extensions thereon: the first is an anchor piece which includes a plug for insertion into an existing breathing hole on the housing, and the second is a ribbed grip tab which is pulled in order to remove the cap from the housing.

Alternative designs for the present invention include: (a) the filter being integrated into the cap as a single unit; (b) the filter being screwed over external threads in the cap; (c) the filter being screwed into internal threads in the cap; and (d) one or both of the extensions being removed.

It is therefore a primary object of the present invention to provide a removable breathable filter cap for use on the upper housing of an emergency spring brake actuator which prevents foreign material from being introduced into the housing from the outside.

It is also a primary object of the present invention to provide a breathable filter cap that may be attached into the opening for a caging tool located on the upper housing of an emergency spring brake actuator.

It is a further important object of the present invention to provide a low cost breathable filter cap that may be attached to the upper housing of any of a number of emergency spring brake actuator designs without any modification to the actuators themselves.

It is a further object of the present invention to provide a breathable filter cap for attachment to the upper housing of an emergency spring brake actuator in conjunction with plugs that are inserted into the breather holes of the housing.

Additional objects of the invention will be apparent from the detailed descriptions and the claims herein.

BRIEF DESCRIPTION OF THE DRAWINGS

FIG. 8 is an enlarged side view of FIG. 7.

FIG. 9A is a top plan view of the grommet of the invention shown in FIG. 1.

FIG. 9B is a cross sectional side view of the grommet of the invention shown in FIG. 9A.

FIG. 9C is a cross sectional end view of the grommet of the invention shown in FIG. 9A.

FIG. 10A is a top plan view of the grommet support shown in FIG. 1.

FIG. 10B is a cross sectional side view of the grommet support shown in FIG. 10A.

FIG. 10C is a detail of the cross sectional side view of the grommet support shown in FIG. 10B.

DETAILED DESCRIPTION OF THE PREFERRED EMBODIMENTS

Figure 5:
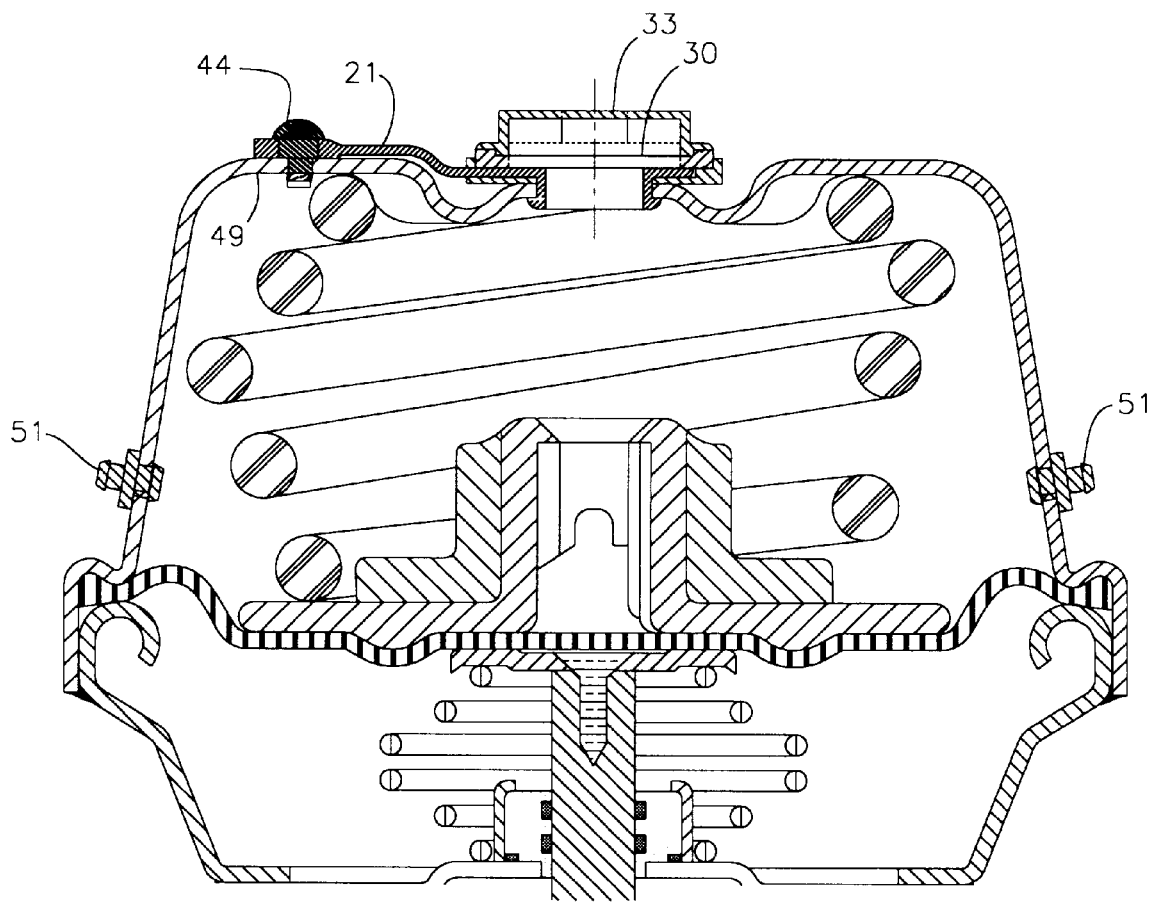
FIG. 5 is a cross sectional side view of the invention shown in FIG. 1 installed in an emergency brake housing.
Figure 6:
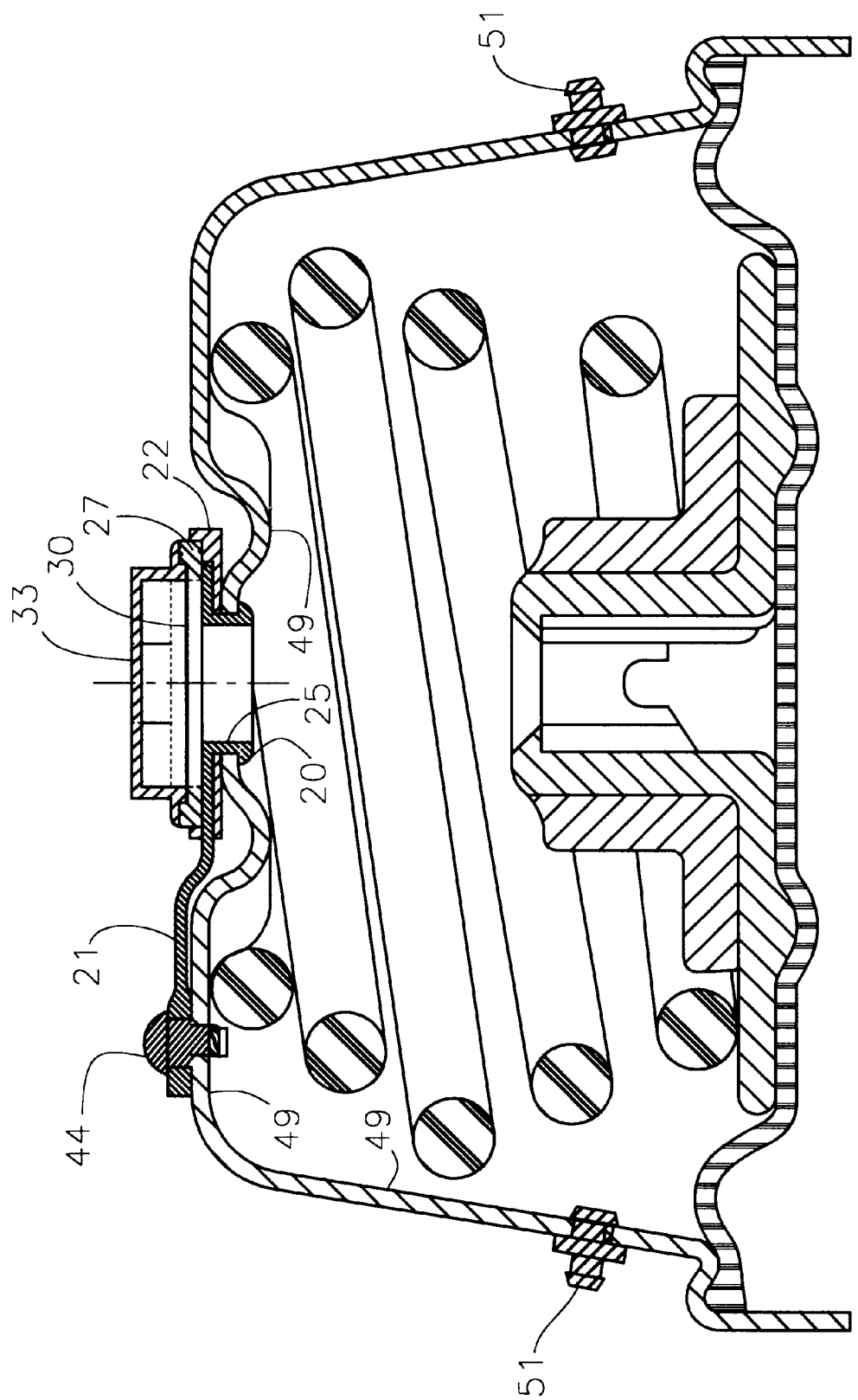
FIG. 6 is an enlarged side view of FIG. 5.

Referring to the drawings wherein like reference characters designate like or corresponding parts throughout the several views, and referring particularly to FIGS. 1–2, and 5–6 it is seen that the invention includes a snap in annular grommet 25 made of flexible plastic or other bendable material having a central opening 18 therein. Grommet 25 includes an upper annular flange 24 and a lower annular locking flange 20. One end of an extension arm 21 is integrally attached to upper flange 24. An opening 19 is provided at the opposite end of arm 21. A plug 44 may be inserted into opening 19 to anchor arm 21 against wall 49 as shown in FIGS. 5–6.

Flange 20 is designed to snap or pop into the caging tool opening located at the center of the top wall 49 of a spring brake actuator as depicted in FIGS. 5 and 6. A rigid annular grommet support member 22 having a central opening therein is provided for receiving grommet 25 and stabilizing it against wall 49 of the actuator. Support member 22 includes a semi-annular rib 23 which engages annular membrane support 27. Support 27 includes cross members 29 for holding membrane in place while allowing air to reach it from below. A thin circular membrane 30 made of oilophobic and hydrophobic material is held in place between the cross members of support 27 and cover 33. Breathing holes 36 are provided in cover 33 to allow air to reach membrane 30 from above.

The cap of the present invention is designed to replace the unfiltered breather holes found in many existing brake actuators. Accordingly, a plurality of plugs 51 are provided for closing up said breather holes when the cap of the present invention is used.

Figure 3:
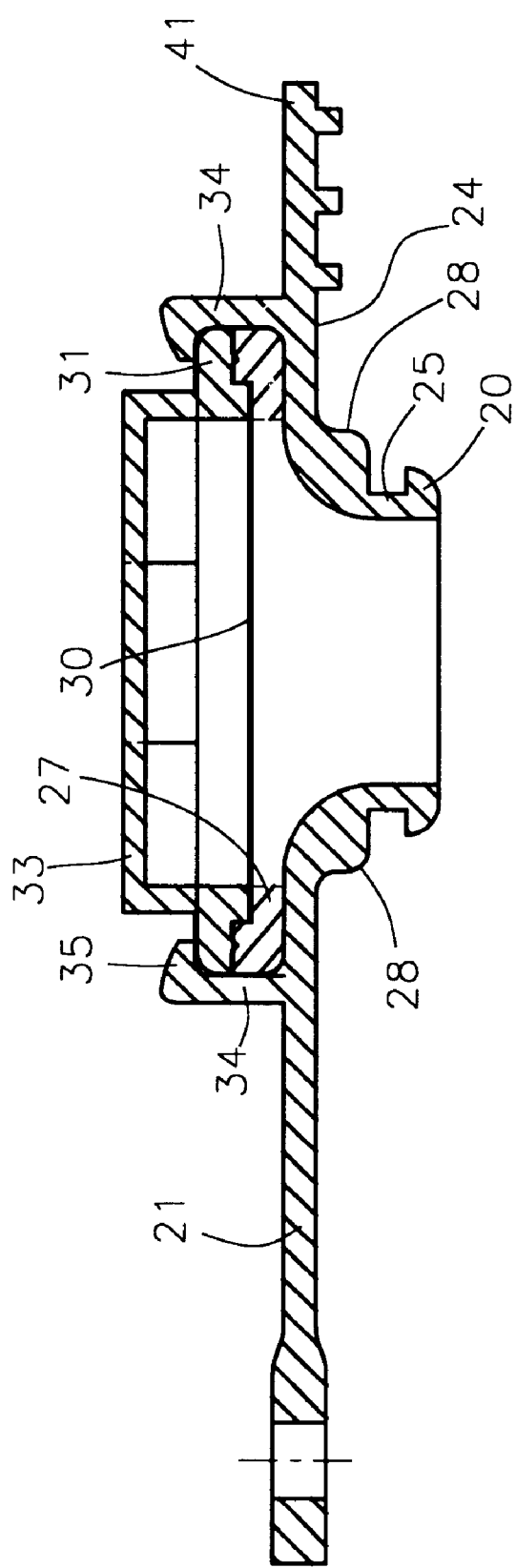
FIG. 3 is a cross sectional side view of a second embodiment of the present invention.
Figure 4:
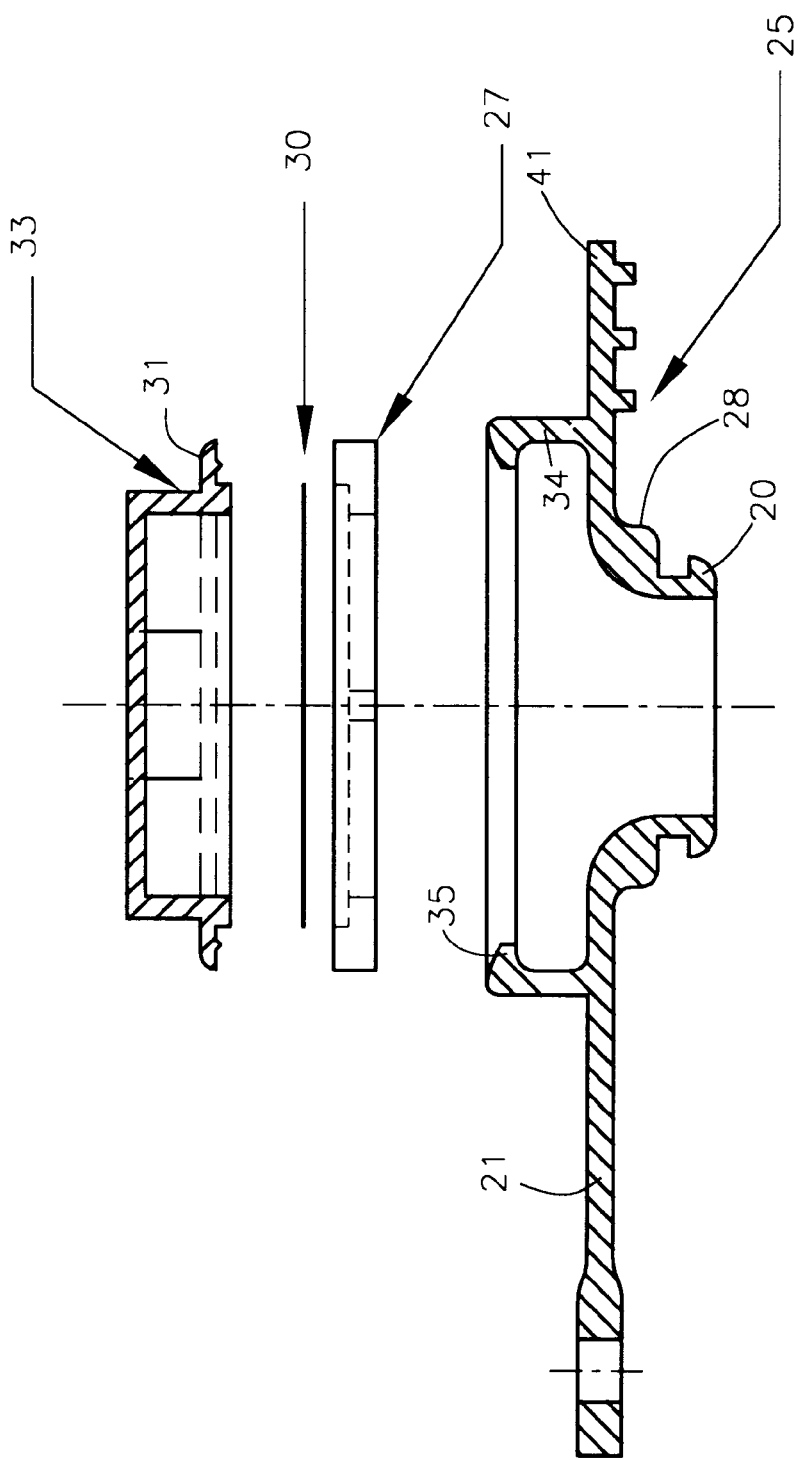
FIG. 4 is an exploded cross sectional side view of the embodiment shown in FIG. 3.
Figure 7:
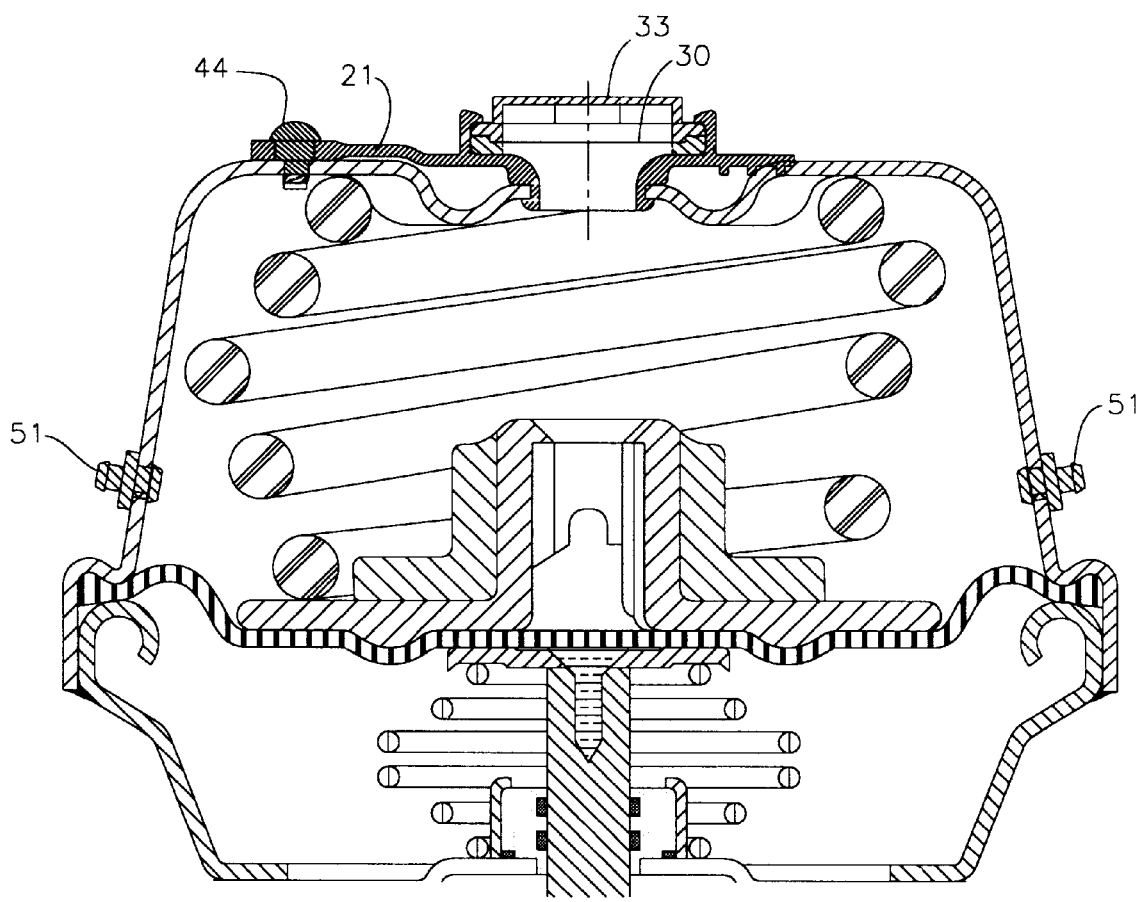
FIG. 7 is a cross sectional side view of the invention shown in FIG. 3 installed in an emergency brake housing.
Figure 11A:
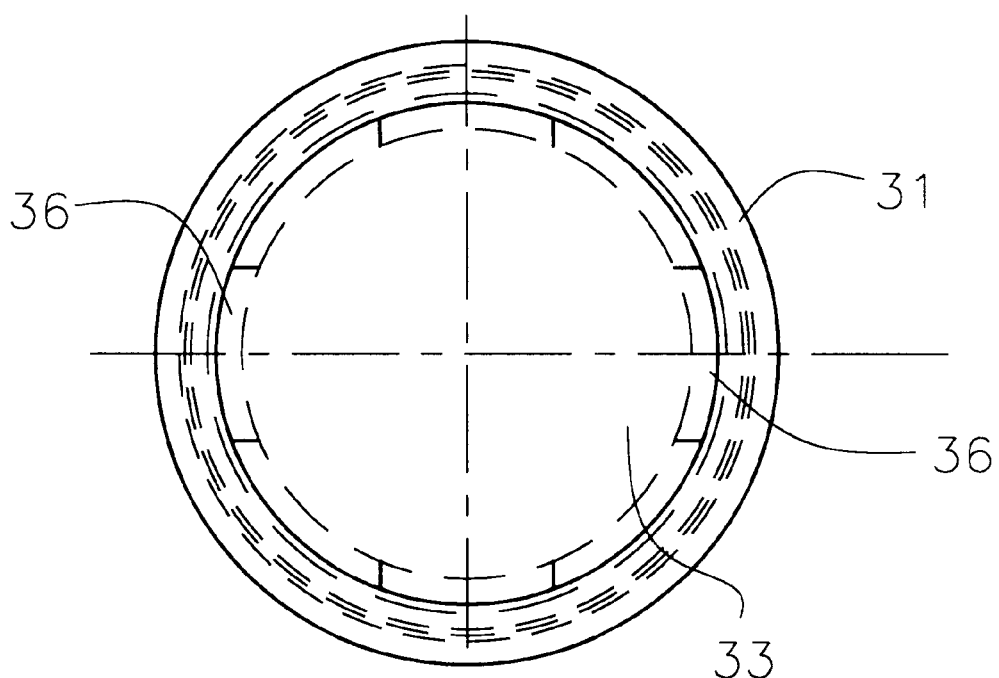
FIG. 11A is a top plan view of the filter top shown in FIG. 1.
Figure 11B:
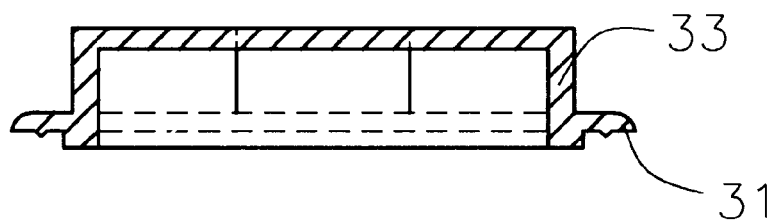
FIG. 11B is a cross sectional side view of the filter top shown in FIG. 11A.
Figure 12A:
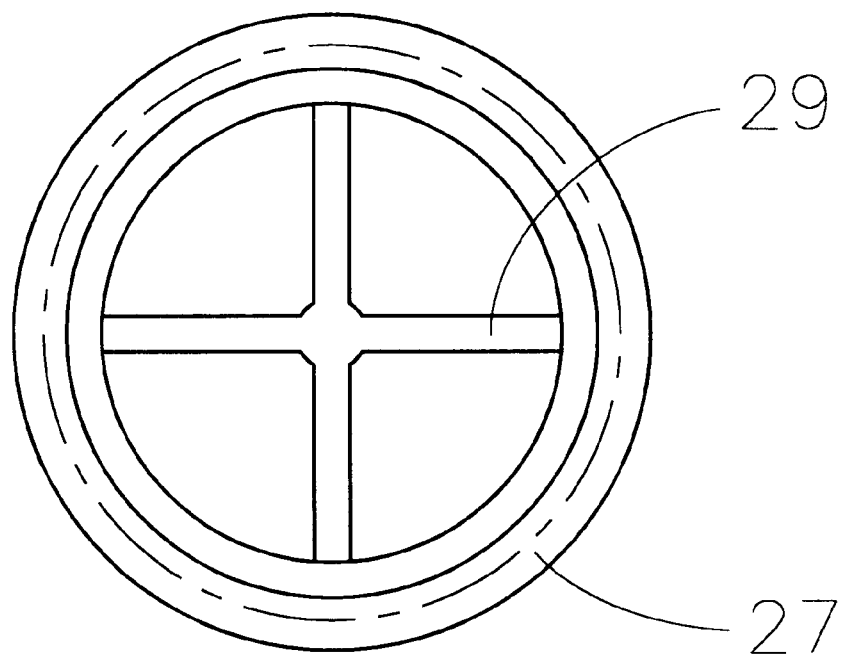
FIG. 12A is a top plan view of the membrane support shown in FIG. 1.
Figure 12B:
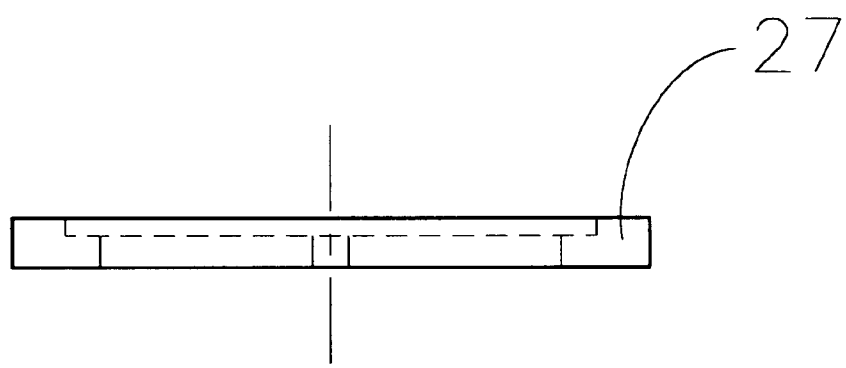
FIG. 12B is a cross sectional side view of the membrane support shown in FIG. 12A.
Figure 13A:
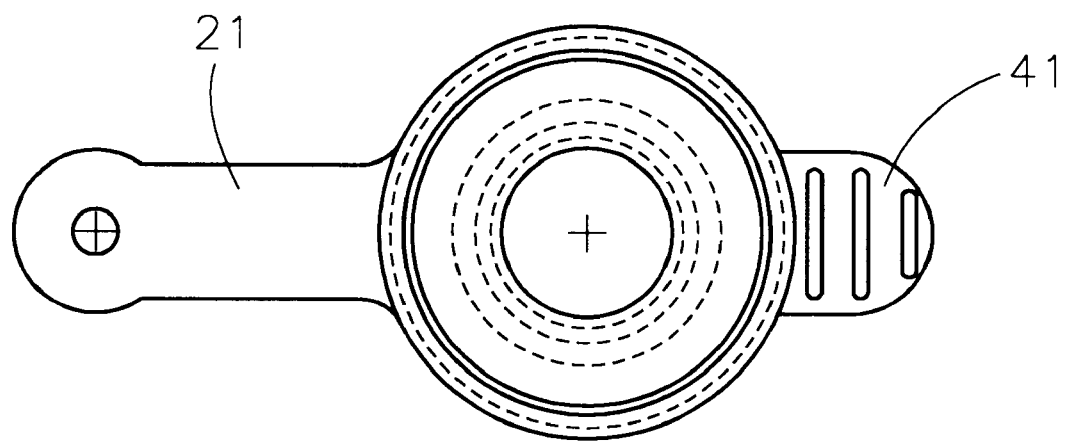
FIG. 13A is a top plan view of the grommet support shown in FIG. 3.
Figure 13B:
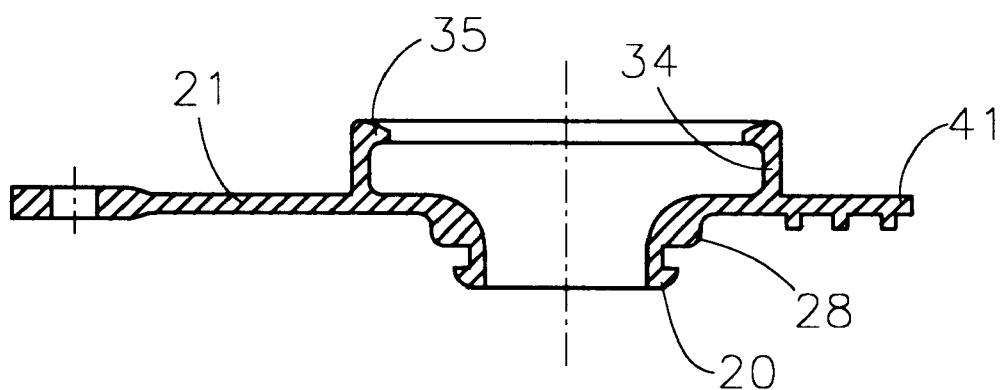
FIG. 13B is a cross sectional side view of the grommet support shown in FIG. 13A.

In an alternative embodiment shown in FIGS. 3–4, and 7–8, it is seen that grommet support 22 is omitted, and the frictional securement against wall 49 is instead provided through an annular rim 28. A removal tab 41 is also provided. Rim 28 and flange 20 of flexible grommet 25 securely engage wall 49 of the brake housing as shown in FIGS. 7–8. A flexible vertical annular upper flange 34 having an annular rim 35 is attached to annular flange 24 of grommet 25. As with the previous embodiment, membrane 30 is sandwiched between support member 27 having cross members 27 10 located thereon, and cover 33 having breather holes 36 located thereon. An outwardly extending annular flange 31 is provided on the exterior of cover 33. Annular rim 35 of upper flange 34 engages flange 31 of cover 33, thereby holding cover 33, membrane 30 and support 27 in place against grommet 25 as shown in FIG. 3.

Figure 1:
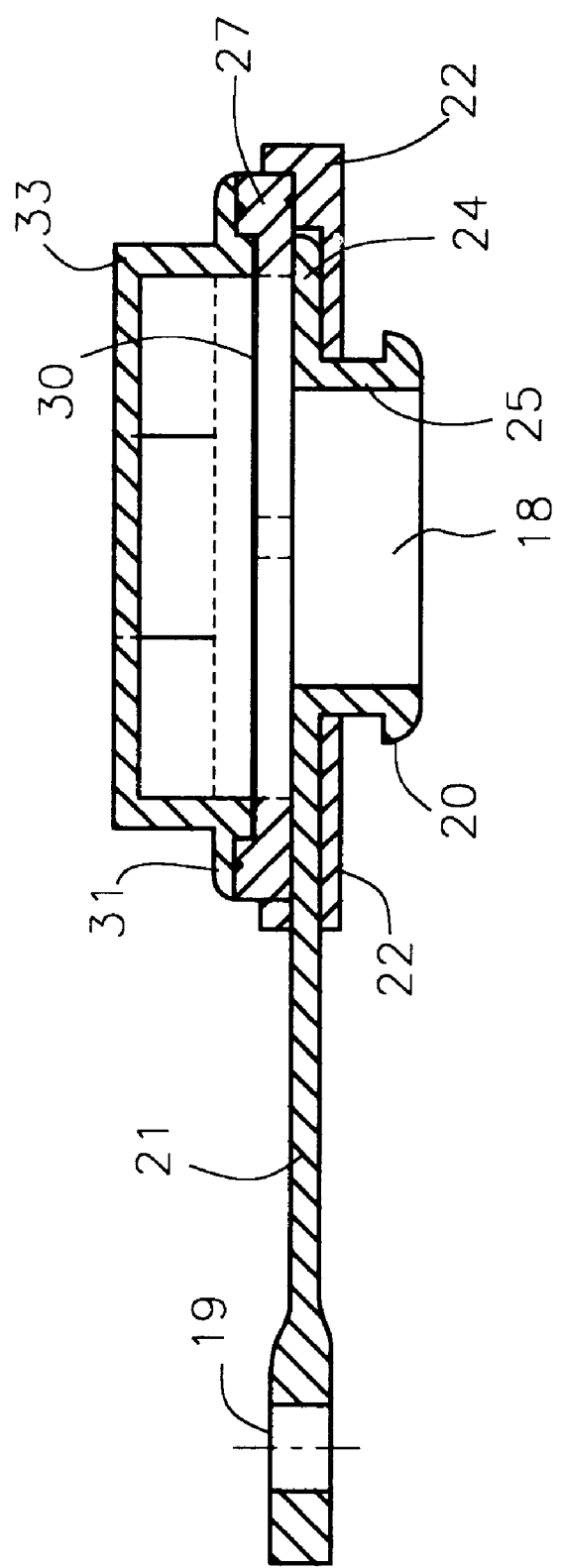
FIG. 1 is a cross sectional side view of a first embodiment of the present invention.
Figure 2:
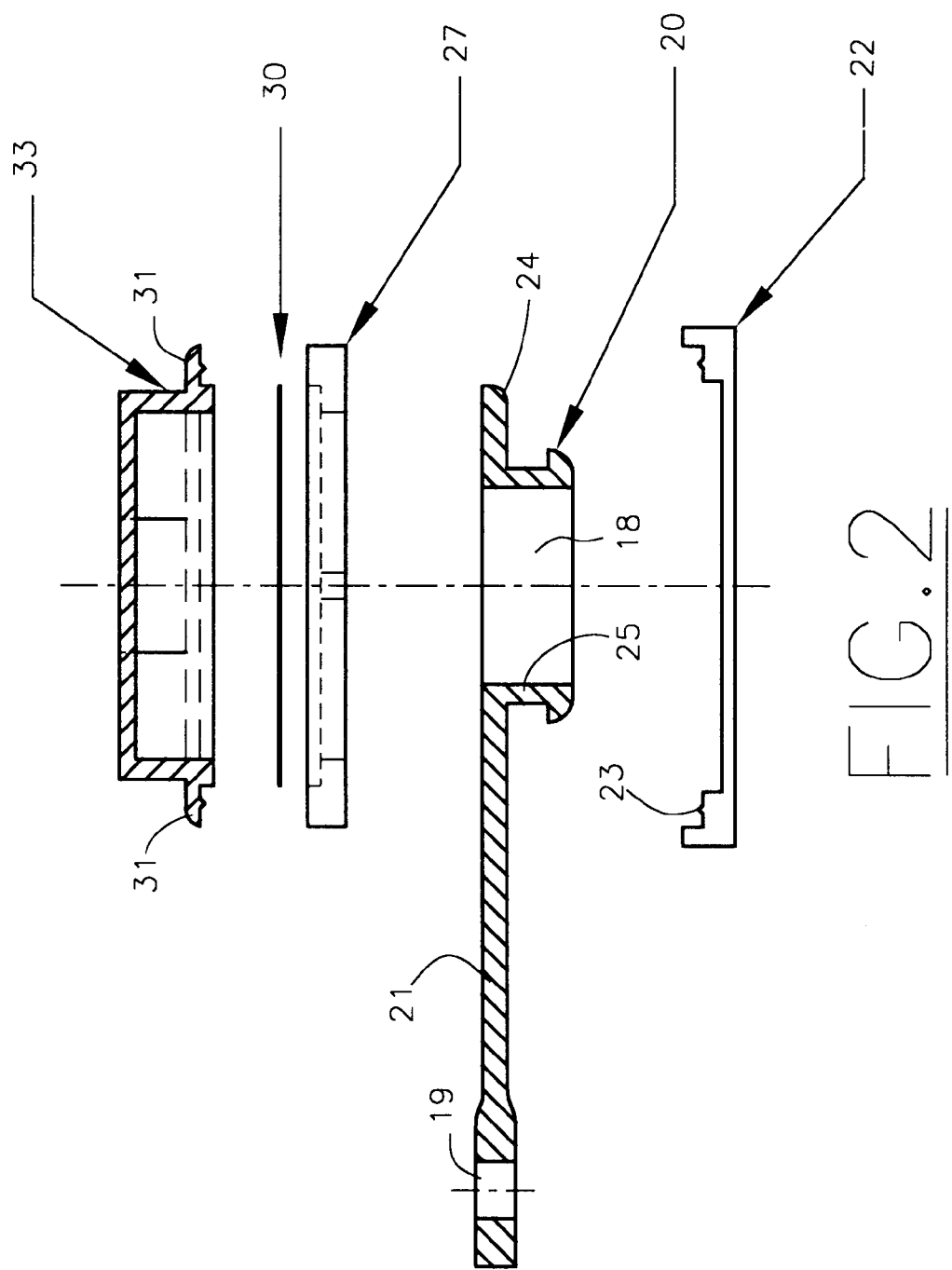
FIG. 2 is an exploded cross sectional side view of the embodiment shown in FIG. 1.

It is seen that the cover 33, membrane 30, and support 27 make up a common unit in each of the above embodiments. Such units are (ultra-) sonically welded together. In the embodiment of FIGS. 1–2, such units may also be sonically welded to support member 22. These units may be easily removed and replaced by new units in the embodiment of FIGS. 3–4, by bending back annular rim 35 of upper flange 34.

Similarly, each of the grommet assemblies described above may itself be easily removed from the housing wall 49 and replaced with a new assembly. This is accomplished by pulling on extension arm 41 (and/or anchor arm 21) to remove (pop out) grommet 25 from wall 49.

In other embodiments, the opening 18 of grommet 25 may be provided with helical threads for threadable engagement with similar threads on the outside of the sonically welded unit comprised of parts 27, 30 and 31. The outside of grommet flanges 34 may be provided with helical threads for threadable engagement with similar threads provided on an annular flange attached to the sonically welded unit. Extensions 21 and/or 41 may also be omitted.

The filter caps of the present invention may be applied to a single-diaphragm stand alone service brake actuator, to a single-diaphragm stand alone emergency brake actuator, or to a combined service and emergency brake actuator.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A filter for a spring brake actuator comprising a removable cap for engagement with a central caging tool opening in said actuator, said cap including an air breathable membrane extended across at least one ventilation hole in order to prevent moisture and foreign material from entering said housing, wherein said cap includes an annular grommet having two ends and a central opening, and an outwardly extending annular flange at one end of said grommet for removable engagement with said opening.

2. The filter of claim 1 wherein said membrane is sandwiched between a support member having a plurality of openings therein and a cover member having a plurality of openings therein to form a unit that is detachable from said cap.

3. The filter of claim 2 wherein said cap includes an extension integrally attached to said grommet, said extension including an opening for receiving an anchor for attachment to said upper housing.

4. The filter of claim 3 wherein said cap includes a second extension integrally attached to said grommet for use in removing said cap from said housing.

5. The filter of claim 2 wherein said brake actuator includes a housing having a plurality of breather holes located therein, and wherein a plurality of plugs are provided for closing said breather holes.

6. The filter of claim 1 wherein said membrane is sandwiched between a support member having a plurality of openings therein and a cover member having a plurality of openings therein to form a unit that is bonded to said cap.

7. In combination a filter for a spring brake actuator and a plurality of plugs, said filter comprising a removable cap for engagement with a central caging tool opening in said actuator, said cap including an air breathable membrane extended across at least one ventilation hole in order to prevent moisture and foreign material from entering said housing, wherein said cap includes an annular grommet having two ends and a central opening, and an outwardly extending annular flange at one end of said grommet for removable engagement with said opening, said plugs being insertable into a plurality of corresponding breather openings in said actuator.

8. The filter of claim 7 wherein said membrane is sandwiched between a support member having a plurality of openings therein and a cover member having a plurality of openings therein to form a unit that is detachable from said cap.

9. The filter of claim 8 wherein said cap includes an extension integrally attached to said grommet, said extension including an opening for receiving an anchor for attachment to said upper housing.

10. The filter of claim 9 wherein said cap includes a second extension integrally attached to said grommet for use in removing said cap from said housing.

11. The filter of claim 8 wherein said membrane is made of oilophobic and hydrophobic material.

12. The filter of claim 7 wherein said membrane is sandwiched between a support member having a plurality of openings therein and a cover member having a plurality of openings therein to form a unit that is bonded to said cap.

13. In a spring actuated vehicle brake having an upper and lower housing attached together, an elastomeric diaphragm suspended within said housing and being sealingly attached to the edges thereof to form a chamber with said lower housing, a compression spring in said upper housing separated from said chamber by said diaphragm, and a plurality of air breather holes in said upper housing, and a central opening in said upper housing for receiving a caging tool, the improvement wherein a filter is provided comprising a removable cap for engagement with said opening, said cap including an air breathable membrane extended across at least one ventilation hole in order to prevent moisture and foreign material from entering said upper housing wherein said cap includes an annular grommet having two ends and a central opening, and an outwardly extending annular flange at one end of said grommet for removable engagement with said opening.

14. The filter of claim 13 wherein said membrane is sandwiched between a support member having a plurality of openings therein and a cover member having a plurality of openings therein to form a unit that is detachable from said cap.

15. The filter of claim 14 wherein said cap includes an extension integrally attached to said grommet, said extension including an opening for receiving an anchor for attachment to said upper housing.

16. The filter of claim 15 wherein said cap includes a second extension integrally attached to said grommet for use in removing said cap from said housing.

17. The filter of claim 15 wherein a plurality of plugs are provided for closing the breather holes in said upper housing.

* * * * *